J. Ericsson.
Port Stopper.
Nº 40,830. Patented Dec. 8, 1863.

Witnesses:
Alex. Pollock
M. M. Livingston

Inventor:
J. Ericsson

UNITED STATES PATENT OFFICE.

JOHN ERICSSON, OF NEW YORK, N. Y.

IMPROVED PORT-STOPPER FOR VESSELS OF WAR.

Specification forming part of Letters Patent No. 40,830, dated December 8, 1863.

*To all whom it may concern:*

Be it known that I, JOHN ERICSSON, of the city, county, and State of New York, have invented a new and Improved Port-Stopper for Vessels of War and Fortifications; and I do hereby declare that the following is a full, clear, and exact description of the same, reference being had to the accompanying drawings, forming part of this specification, in which—

Figure 1:
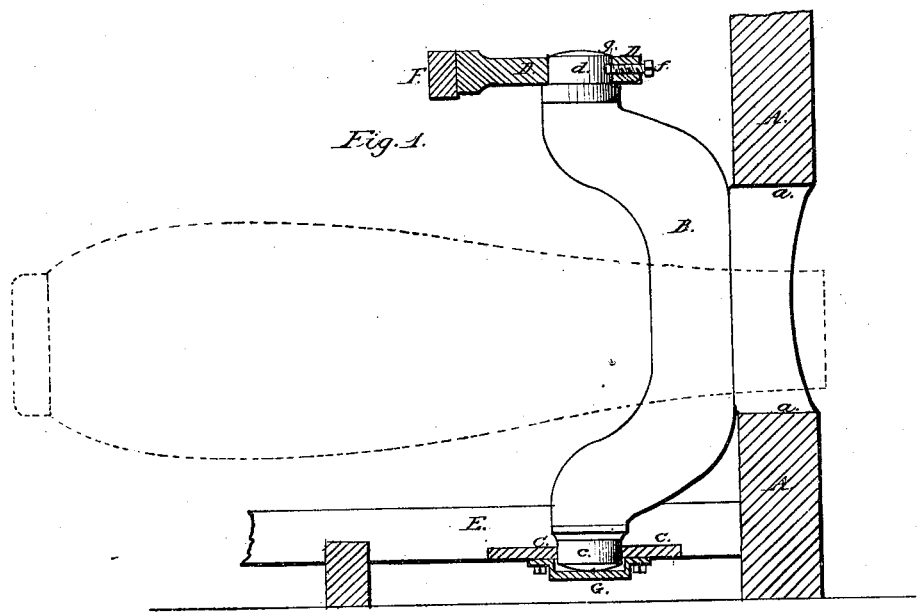
Figure 2:
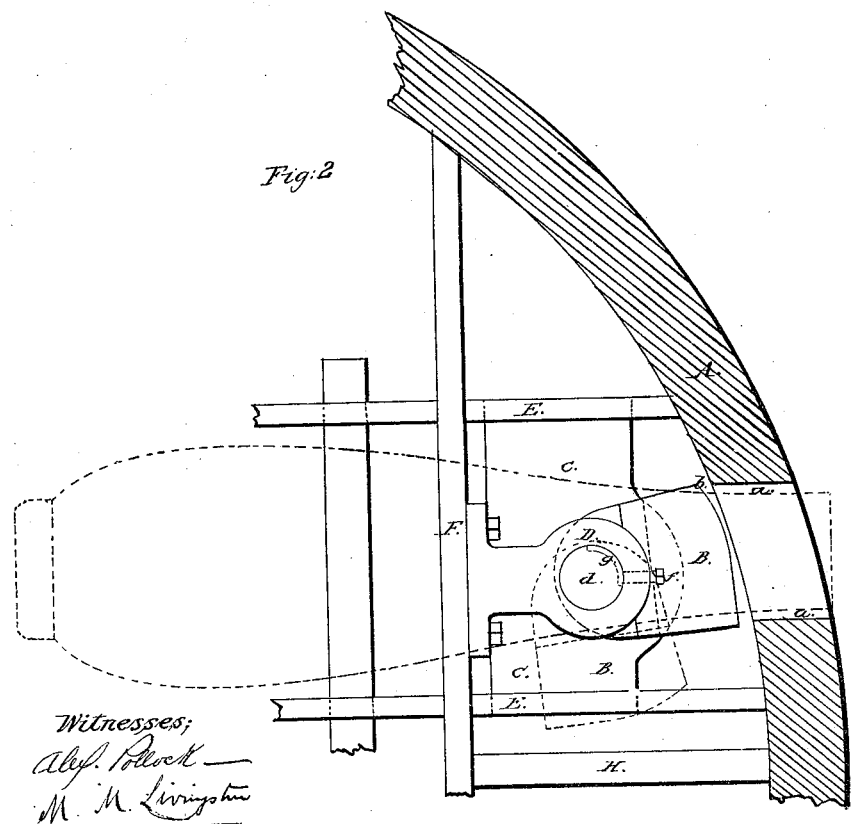

Figure 1 exhibits a vertical section of a portion of the turret of a vessel of war and a side view of the port-stopper. Fig. 2 is a plan corresponding with Fig. 1, the turret being shown in section.

Similar letters of reference indicate corresponding parts in both figures.

The immense weight of which it is necessary to make the port-stoppers of iron-clad, turreted, or other vessels intended to be invulnerable, to give them the requisite power of resistance to projectiles, has rendered them as hitherto applied extremely difficult of operation, owing to the great amount of power required to move them, and the methods hitherto adopted of applying them have rendered them liable to be so "bound" or disarranged by the blow of a shot as to make it impossible to operate them.

The object of my invention is to obtain for a port-stopper the requisite power of resistance, and yet enable it to be worked by the application of a very small amount of power, and to prevent its being seriously bound or obstructed in its action by any displacement or disarrangement which is likely to be produced by the blow of a projectile.

With a view to accomplish the above object my invention consists in the construction of the stopper in the form of a crank; also, in its arrangement to turn about an upright or nearly upright axis situated some distance within or behind and opposite, or nearly so, to the center of the port or embrasure; and, further, in the attachment of the bearings in which the journals or pivots of the port-stopper turn to supports which are detached from the wall of the turret or other defensive structure in the immediate neighborhood of the port.

To enable others skilled in the art to make and use my invention, I will proceed to describe its construction and operation.

A is a portion of the wall of a turret, and $a$ is a gun-port formed therein.

B is the crank-formed port-stopper, having its journals or pivots $c$ and $d$ at opposite ends. This I propose, generally, to forge entirely in one piece, though it may be composed of several pieces of wrought-iron secured together in a suitable manner, and to make it of such strength that it will not be broken or materially injured by the heaviest projectiles to which it is likely to be exposed. The outer face of the offset portion of the crank, which forms the face of the port-stopper, is made of a shape to conform as nearly as practicable to the inner surface of the wall A, but rounded off, as shown at $b$ in Fig. 2, on one side to allow it to clear the wall in its opening and closing movement, and the said face is wide enough and long enough to cover the port. The amount of offset is such that when the port-stopper is set up with its journals in bearings so arranged within the turret its axis is opposite, or nearly so, to the center of the port, and the offset portion is turned aside, as shown in red color in Fig. 2, the gun may pass the said offset portion in its passage in and out.

C and D are the bearings for the journals $c$ and $d$ of the port-stopper. The lower bearing, C, is composed of a plate arranged across and bolted to the gun-slides E E, and the whole weight of the port-stopper is supported in an oil-box, G, which is secured under the said bearing, the bottom of the oil-box forming the step. The upper bearing, D, is bolted to a wrought-iron beam, F, arranged across the upper part of the turret and braced by one or more braces, H, at right angles. The bearings are made very shallow, so that in case of any slight disarrangement by a shot striking the port-stopper, or by other means, the journals will not "bind," and as the bearings are detached from the turret in the neighborhood of the port, a shot striking the turret near the port will not be likely to interfere with the operation of the port-stopper. The arrangement of the bearings is such as to maintain the axis of the journals $c\,d$, which is the axis about which the port-stopper moves, in a vertical position opposite, or nearly so, to the center of the port, and at such distance from the inner wall of the turret as to allow the offset portion to be presented directly opposite the port, as shown in Fig. 1, and also in Fig. 2 in black outline, without quite touching the wall of the turret, so that the only friction in working the port-stopper is that of the journals and their bearings and of the step; and the movement about the vertical axis can be effected with a very small application of power, such power being applied by one or more men to a horizontal bar inserted into a hole provided for its reception in the port-stopper. By the arrangement of the bearings directly opposite the port the port-stopper is sustained against the blow of a projectile in such a direction as to best resist the force of the impact of that projectile. I however propose to make the stopper of such strength that the inertia due to its great weight will give a great portion of the necessary resistance, and so relieve the bearings or supports of the effect of the blow.

In order to prevent the port-stopper from being turned farther in one direction than is necessary to close the port, and in the other direction farther than is necessary to allow the gun to pass it—viz., about a quarter of a revolution in each direction—there is a stop-screw, *f*, inserted through the bearing D, and a groove, *g*, cut part of the way around the journal *d*, to receive the end of said screw, the length of the said groove determining the movement of the port-stopper.

The port-stopper is to be applied within the sides of a vessel or the walls of any defensive structure in substantially the same manner as within the walls of a turret.

What I claim as my invention, and desire to secure by Letters Patent, is—

1. The construction of a port-stopper in the form of a crank, substantially as herein specified.

2. The arrangement of a port-stopper to turn about an upright or nearly upright axis situated some distance within or behind and opposite or nearly opposite to the center of the port, substantially as and for the purpose herein specified.

3. The attachment of the bearings for the pivots or journals of the port-stopper to supports which are detached from the wall of the turret or other defensive structure in the immediate neighborhood of the port, substantially as herein described.

J. ERICSSON.

Witnesses:
ALEX. POLLOCK,
M. M. LIVINGSTON.